United States Patent
Tavernier et al.

(10) Patent No.: US 6,248,492 B1
(45) Date of Patent: *Jun. 19, 2001

(54) METHOD FOR ELECTROSTATOGRAPHICALLY PRODUCING MASTER IMAGES FOR DECORATION OF CERAMIC OBJECTS

(75) Inventors: Serge Tavernier, Lint; Werner Op De Beeck, Keerbergen; Daniel Heitzmann, Mortsel, all of (BE)

(73) Assignee: Xeikon NV (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/249,812

(22) Filed: Feb. 16, 1999

Related U.S. Application Data

(63) Continuation-in-part of application No. 08/991,344, filed on Dec. 16, 1997, now Pat. No. 5,966,571.

(30) Foreign Application Priority Data

Dec. 24, 1996 (EP) .................................................. 96203714

(51) Int. Cl.⁷ ...................................................... G03G 9/00
(52) U.S. Cl. ............................ 430/110; 430/111; 430/137
(58) Field of Search ..................................... 430/110, 111, 430/126

(56) References Cited

U.S. PATENT DOCUMENTS

| | | | |
|---|---|---|---|
| 5,750,299 | 5/1998 | Ohishma et al. | 430/47 |
| 5,966,571 * | 10/1999 | Tavernier et al. | 430/126 |
| 5,972,548 * | 10/1999 | Landa et al. | 430/110 |
| 5,976,736 * | 11/1999 | Kawase et al. | 430/126 |
| 6,045,960 * | 4/2000 | Nielson et al. | 430/110 |
| 6,110,632 | 8/2000 | Dunford et al. | 430/106 |

FOREIGN PATENT DOCUMENTS

WO98/01793    1/1998   (WO).

* cited by examiner

Primary Examiner—Mark Chapman
(74) Attorney, Agent, or Firm—Knobbe, Martens, Olson & Bear, LLP

(57) ABSTRACT

An electrostatic method for producing a master image for decorating ceramic, enamel or glass objects comprising the steps of:

- providing a temporary support having a surface with release properties,
- image-wise depositing charged toner particles, having a volume average particle size $d_v$, such that $5\ \mu m < d_v < 15\ \mu m$ the particles including in the bulk particles of a ceramic pigment, CP, selected from the group of metals, metal oxides and mixed metal oxides, having a volumetric particle size distribution such that 90% of the particles have a diameter lower than $\tfrac{2}{3}$ times $d_v$, and
- providing particles of glazing material, having a volumetric particle size distribution such that 90% of the particles have a diameter lower than $\tfrac{2}{3}\ d_v$, in the master image.

Preferably the glazing material is brought in the master image by image-wise depositing toner particles comprising in the bulk of the toner particles both a ceramic pigment and glazing material.

33 Claims, No Drawings

METHOD FOR ELECTROSTATOGRAPHICALLY PRODUCING MASTER IMAGES FOR DECORATION OF CERAMIC OBJECTS

This application is a continuation-in-part of U.S. application Ser. No. 08/991,344 filed Dec. 16, 1997, now U.S. Pat. No. 5,966,571 which claims the benefit of EP 96203714.9, filed Dec. 24, 1996.

FIELD OF THE INVENTION

The present invention relates to a method for providing a master image for decorating ceramic, enamel or glass objects by means of electro(stato)graphy.

BACKGROUND OF THE INVENTION

Decoration of ceramic, enamel or glass objects mostly proceeds by providing a master image, monochromic or full color, on a substrate with releasing properties, by transferring said master image to the ceramic, enamel or glass object and by firing said objects to fix the image on said ceramic, enamel or glass object.

The master image is mostly made by screen-printing. In screen printing it is necessary to produce various screen images for the various colors to be printed, which makes the technique quite time-consuming and for small edition or personalized work totally uneconomical. By decoration is mostly to be understood the application of identification printing on ceramics or glassware, e.g., a label, a bar-code, etc. Moreover, the screen printing process uses liquids, mostly organic and volatile, and requires thus measures to avoid organic vapors to reach the environment. Further, screen printing is basically an analogue process while nowadays more and more information and images to be printed become available in digital form.

The need for a dry and digital method for producing master images for decorating ceramic of glass objects is thus real.

In EP-A 097 134, it has been disclosed to decorate tiles by electrostatographic methods. Electrically charged dry coloring ceramic pigment particles are image-wise deposited onto a photoconductive drum and transferred to a tile. The ceramic material contains no binder resin, and therefore quite complex transfer and bonding aids have to be applied to the tile to assist the transfer and the bonding of the ceramic pigment to the tile in order to be able to flawlessly further process the tile. In this document it is disclosed to produce multi-color images by using a machine printing for each color. Apart from the need for complex transfer and bonding aids on the tile, the method according to this disclosure presents some additional problems: first, the contact between photoconductor and tile is rather unstable since an attempt is made to contact two hard surfaces, secondly the photoconductor is very likely to be damaged, since it is a fragile member whereas the tile is hard, thirdly, since the contact is unstable, difficulties arise to register the color image. Finally, add-on transfer of different colors on already deposited color layers will be critical in the unstable contact. Apart from cited problems, the disclosure is limited to the decoration of flat tiles and is not useful for decorating essentially non-flat objects.

In DE-A 40 41 358 it is disclosed to use master images made by electrophotography to decorate ceramic, enamel or glass objects by transferring said master images to said objects. The method includes the steps of providing an image-wise deposition of toner particles exhibiting ceramic coloring characteristics on an intermediate substrate having release properties, and transferring said master image to an object by first coating the master image with a collodion lacquer. There is, however, in this disclosure no special attention given to the electrophotographic process and the disclosure hints to the fact that any photocopying machine, whatever the imaging method, fixing method, transporting method of the master image, the method can provide good images. It is in anyway necessary to fix the toner particles to the intermediate, since a non-fixed toner image can barely be handled. It is furthermore disclosed that said process is only workable when the toner particles contain, apart from a binder resin, either a metal, a metal alloy and/or a metal-oxide. It is disclosed that only by using such toner particles and pigments a master image can be created giving, after transfer and firing to the object to be decorated, enough optical density and sharpness of the final image. By limiting the useful pigments to either a metal, a metal alloy and/or a metal oxide, the method disclosed in DE 40 41 358 has a limited practical use, as within the type of pigments enumerated only a few colors can be provided.

In EP-A 647 885 an electrophotographic method, essentially equal to the method disclosed in DE-A 40 41 358, for the production of master images for the decoration of ceramic objects is disclosed. The problem obtaining high optical density with toner particles comprising ceramic pigments (i.e. mostly metal oxides) is addressed by laying very thick toner layers (between 0.3 and 0.6 mm thick, whereas a normal full color electrophotographic image comprises toner layers of 0.01 mm thickness). These thick toner layers can give problems during the fixing to the intermediate substrate, therefore a non-contact fixing step in an oven or by contacting the rear side (non-image side) of the intermediate substrate is used. In this disclosure it is said that optionally glazing material can be applied to the object to be decorated before the master image is transferred or after the master image is transferred. This document discloses further that it is essential that the toner particles contain a binder and a ceramic pigment, said pigment being preferably a spinel or zirconiumsilicate, and optionally a charge enhancing compound and some flow enhancing additives, in order to be able to obtain a high optical density. This indicates that the method disclosed, shows, even when depositing thick toner layers, a problem in obtaining enough optical density.

In JP-A 08/11496 it is disclosed to produce master images for decoration of ceramics by electrostatographic means and by using toner particles comprising both a coloring agent and glazing material.

In GB-A-2 151 189 a process for applying a pattern to a ceramic article disclosed, wherein a pattern is generated by a reprographic process and this pattern then printed on a temporary support with release properties. The printing of the pattern can proceed by a xerographic process.

In U.S. Pat. No. 5,750,299, a method for decorating ceramic articles by means of electrophotographical methods are disclosed together with developers to execute the methods.

In EP-A-208 378, and U.S. Pat. No. 4,943,506 white toner particles, comprising $TiO_2$ as pigment have been disclosed. In U.S. Pat. No. 4,990,427 a black toner comprising a inorganic black pigment is disclosed.

Although the methods, disclosed in the references cited, do present a step forward when compared to methods using screen printing to form a master image, there is still room for improvement of the electro(stato)graphic method for producing master images.

OBJECTS AND SUMMARY OF THE INVENTION

It is an object of the present invention to provide an electrostatographic method for producing a master image for decorating ceramic, enamel or glass objects making it possible to obtain high color saturation with toner layers of small thickness.

It is an object of the present invention to provide an electrostatographic method for producing a master image for decorating ceramic, enamel or glass objects making it possible to obtain on the object to be decorated an image that shows low noise and graininess.

It is a further object of the invention to provide to provide an electrostatographic method for producing a master image for decorating ceramic, enamel or glass objects making it possible to produce master images that are highly compatible with the ceramic, enamel or glass object to be decorated and that do not give rise to crackle during or after firing.

Further objects and advantage of the present invention will become clear from the detailed description hereinafter.

The objects of the present invention are realized by providing a method for producing a master image for decorating ceramic, enamel or glass objects comprising the steps of:

image-wise depositing charged toner particles, having a volume average particle size $d_v$, such that $5\ \mu m < d_v < 15\ \mu m$, and comprising a resin and dispersed in said resin particles of a ceramic pigment, CP, on a surface of a temporary support, said surface having release properties and providing particles of glazing material in said master image, characterized in that said particles of said ceramic pigment have a volumetric particle size distribution such that 90% of said particles have a diameter lower than $\frac{2}{3}$ times $d_v$ and said particles of said glazing material have a volumetric particle size distribution such that 90% of the particles have a diameter lower than $\frac{2}{3}\ d_v$.

DEFINITIONS

Throughout this document the wording "CP-toner" is used to indicate toner particles comprising a toner resin and at least a ceramic pigment (can further comprise, a.o. glazing material) dispersed in said resin. Ceramic pigment are pigments that after application to ceramic objects, glass objects or enameled objects and after firing give a pigmentation to said objects.

Throughout this document the wording "GL-toner" is used to indicate toner particles comprising a toner resin and at least glazing material (can further comprise, a.o. a ceramic pigment) dispersed in said resin.

Throughout this document the wording "CPGL-toner" is used to indicate toner particles comprising a toner resin and dispersed in said resin both a ceramic pigment and glazing material.

"Glazing material" as used in this document means a mixture of at least one metal oxide with siliciumdioxide and/or borontrioxide, or a pre-fired mixture of at least one metal oxide with siliciumdioxide and/or borontrioxide milled or not after firing.

By "decoration" is to be understood not only the application of artistic images, but also identification printing on ceramics or glassware, e.g., a label, a bar-code, etc.

DETAILED DESCRIPTION OF THE INVENTION

An electrostatographic method for decorating ceramic, enamel or glass objects includes the steps of providing a master image on a temporary support having release properties, and transferring said master image to an object and firing the transferred image with the object to fix the image to the object.

When said master image is made by image-wise depositing toner particles comprising a toner resin and ceramic pigments, but the master image does not comprise glazing material, on a temporary support, it arrives frequently that when firing the transferred image severe crackle appears. It can also happen that the fired image is, after firing, not strongly enough adhered to the ceramic, enamel or glass object and becomes easily damaged.

It was found that both problems could be circumvented when the master image, not only comprised image-wise toner particles containing a toner resin and a ceramic pigment, but by further adding glazing material to the master image. The presence of glazing material in the master image seems to help the adhesion and the smoothness of the final image after firing, presumably (without being bound by any theory) by ameliorating the interflow of the glazing of the object to be decorated and the master image during firing, or improves the wetting of the object to be decorated.

It showed that, after firing the transferred master image to the object to be decorated, the final image showed easily a visible noise or graininess, especially in the portions of the images with an even density. It was found that this graininess or noise was not only dependent on the particle size of the CP-toner used, but also on the particle size of the ceramic pigment and on the particle size of the glazing material that is added to the master image.

It was found that, when using CP-toner with a volume average particle size $d_v$ between 5 and 15 $\mu$m, the noise in the final image, i.e. the image on the object to be decorated after transferring the master image, could be controlled to an acceptable level, when the ceramic pigment has a volumetric particle size distribution such that 90% of the particles have a diameter lower than $\frac{2}{3}$ times $d_v$ and the glazing material has a volumetric particle size distribution such that 90% of the particles have a diameter lower than $d_v$. The noise or graininess could be made even lower when ceramic pigments were used with a volumetric particle size distribution such that 90% of the particles have a diameter lower than $\frac{1}{2}$ times $d_v$. An improvement in noise and graininess was also observed when the glazing material has a volumetric particle size distribution such that 90% of the particles have a diameter lower than $\frac{3}{4}$ times $d_v$. Further improvement was observed when the particle size of both the ceramic pigment and the glazing material glazing material were adjusted to the particle size of the toner. Very low noise was observed when ceramic pigments were used with a volumetric particle size distribution such that 90% of the particles have a diameter lower than $\frac{1}{2}$ times $d_v$ together with glazing material having a volumetric particle size distribution such that 90% of the particles have a diameter lower than $\frac{3}{4}$ times $d_v$. When the volumetric particle size of the glazing material was such that 90% of the particles have a diameter lower than $\frac{1}{2}$ times $d_v$ even better image quality was observed. It proved beneficial for the intensity of the color in the finished decor on the ceramic, enamel or glass object, that the ceramic pigment used in this invention had not only a volumetric particle size distribution such that 90% of the particles have a diameter lower than $\frac{2}{3}$ times $d_v$ but that said volumetric particle size distribution was such that 80% of the particles have a diameter larger than 0.10 $\mu$m.

The particle size of both the ceramic pigment and the glazing material is measured with a COULTER LS130 (trade name). Thus device measures the particle size by light scattering.

The method according to the present invention can be a purely electro(stato)graphic method or a combined method wherein electro(stato)graphic deposition of toner particles to form some of the layers forming the master image and screen printing (or other methods, e.g. coating, spraying) of other layers forming the master image are combined.

The glazing material can be provided in the master image in several ways. Thus the present invention encompasses several embodiments:

The First Embodiment

The glazing material can be provided in the master image by image-wise depositing a CPGL-toner, i.e. a toner comprising a toner resin and both a ceramic pigment and glazing material, to form the image. This is in fact a preferred embodiment of this invention.

This embodiment has the advantage that the separate steps of applying glazing material, can be avoided although it is perfectly well possible, if so wished, to combine this first embodiment with further separate steps of applying glazing material. When the toner particles, for producing a master image according to this embodiment of the present invention, comprise both a ceramic pigment (CP) and glazing material (GL) it is preferred that the toner particles comprise both said ingredients in a volume ratio fulfilling the equation: $0.5<GL/CP<5$, preferably said volume ratio fulfills the equation $1<GL/CP<3$.

These volume ratios can be transformed in weight ratios, taking in account the specific gravity of both the ceramic pigment and the glazing material.

When using the method according to the present invention for the production of a full color master image, it is possible, within the scope of the first embodiment of the invention to, use a CPGL-toner in the image-wise deposition of only one layer of colored particles and using a CP-toner without glazing material, for the deposition of the other layers. It is also possible to use several differently colored CPGL-toners, or to use CPGL-toner for the image-wise deposition of all toner layers.

The first embodiment of the invention is very interesting by the fact that by using this method the ceramic pigments and the glazing material are intimately mixed in at least one layer of toner particles in the master image. When the master image is produced by the overlay or juxtaposition of multiple layers of different toner particles, it is preferred that in each toner layer a CPGL-toner is used. The use of master images wherein both ceramic pigments and glazing material are intimately mixed in every deposited toner layer, has a very beneficial effect regarding the smoothness, strength and gloss of the final image on the object to be decorated. The first embodiment of the invention is also very interesting for the production of monochrome master images in simple and relatively cheap apparatus. When making full color master images it is preferred to use an apparatus making it possible to deposit several different toner particles, thus an apparatus having at least four, preferably five toner stations. In such an apparatus the additional deposition of a GL-toner entails little problems or additional costs of the apparatus. When only the production of monochrome master images is desired, the use of an apparatus comprising several toning stations is still possible but is less desirable from the point of view of cost price and complexity of the apparatus. Thus for the production of exclusively monochrome images, a method that can be executed in an apparatus comprising only one or at most two toner stations is desirable. The first embodiment of this invention, wherein toner particles comprising both ceramic pigments and glazing material (a CPGL-toner) are used provides such a method.

The Second Embodiment

The glazing material can be brought in the master image by applying glazing material on the temporary support before image-wise depositing a CP-toner (with or without glazing material).

This means that a method, for producing a master image for decorating ceramic, enamel or glass objects comprises, according to the second embodiment of this invention, the steps of:

i) providing a temporary support, having at least one surface with release properties, with glazing material on said surface having release properties, ii) image-wise depositing toner particles on said surface of said temporary support having release properties, said toner particles comprising ceramic pigments (CP-toner) and iii) fusing said CP-toner to said temporary support.

The glazing material can applied on said temporary support by including said glazing material in a release layer applied to the temporary support to impart release properties to the temporary support. Therefore, e.g., a coating solution for the release layer is designed wherein glazing material is present and, when applying said coating solution to said substrate, both a release layer and glazing material are present. In this case the release layer is preferably designed so that, during the release process (wherein the master image is released from the temporary support), the release layer splits (i.e. breaks cohesively). By this cohesively breaking, a portion of the glazing material, contained in the release layer, is carried over to the object to be decorated together with the master image.

The glazing material can also be applied to said temporary support in a separate layer on the surface of the temporary support showing release properties. In this case, e.g., finely divided powder of glazing materials is dispersed in a film forming binder and a solvent. The film forming binder is preferably a hydrophilic colloid as, e.g. gelatin, polyvinylalcohol, etc.) and the solvent is preferably water so as to form an aqueous coating solution. The layer, containing glazing material, is preferably hardened so as to diminish the water solubility of the layer. This is very interesting since in the art of decorating ceramic, enamel or glass objects, the transfer of a master image often proceeds by moistening the master image to release the image from the temporary support. The hardening of the layer comprising the glazing material can proceed by the hardeners known in the art, e.g. formaldehyde and free dialdehydes, such as succinaldehyde and glutaraldehyde, blocked dialdehydes, active esters, sulfonate esters, active halogen compounds, s-triazines and diazines, epoxides, active olefins having two or more active bonds, active olefins, carbodiimides, isoxazolium salts unsubsituted in the 3-position, esters of 2-alkoxy-N-carboxy-dihydroquinoline, N-carbamoyl and N-carbamoylpyridinium salts, hardeners of mixed function, such as halogen-substituted aldehyde acids (e.g. mucochloric and mucobromic acids), onium substituted acroleins and vinyl sulfones and polymeric hardeners, such as dialdehyde starches and copoly(acroleinmethacrylic acid).

The layer comprising the glazing material can be present on the entire surface of the temporary support (over-all application) as well as only on the area of said surface where the image will be applied on the temporary substrate. In this latter case two possible implementations exist: the glazing material is only deposited in those areas of the image where also CP-toner is present (image-wise application), the glazing material is deposited over the totality of the area where the image will be formed by deposition of CP-toner (non-image-wise application). The presence of glaze material in "over-all application" or in "non-image-wise way application", are preferred implementations of the second embodiment of this invention. It was found that the presence of glazing material all over the image provides after firing a very strong, non-crackled image that, in addition, showed a very even gloss.

When the glazing material is image-wise applied to said substrate, it is preferred, in the second embodiment of this invention, that, before the image-wise deposition of CP-toner, a GL-toner is image-wise deposited. The image-wise application of glazing material to the substrate can also proceed before the electrostatographic deposition of CP-toner, by screen printing.

The Third Embodiment

The glazing material can, when at least two layers of CP-toner are deposited, be applied to the master image between said two layers of CP-toner (with or without glazing material).

In this embodiment the electro(stato)graphic method for producing a master image can be combined with other methods of applying glazing material. It is within the scope of the third embodiment of this invention, e.g., possible to image-wise deposit one layer of CP-toner, fuse it to the temporary support (intermediate fusing), apply off-line glazing material by coating or spraying it on the toner layer and re-introduce the support, carrying now an image-wise toner layer and a layer of glazing material, in an electro(stato) graphic process and image-wise deposit a further layer or further layers of CP-toner, or CPGL-toner, or GL-toner, and finally fuse the master image.

In this third embodiment of the invention, it is preferred to apply said glazing material by electrostatographic means, by the deposition, either image-wise or non-image-wise, of a layer of GL-toner, without ceramic pigment.

The Fourth Embodiment

The glazing material can be applied after the image-wise deposition of said CP-toner.

The glazing material can also be applied in such a way that the amount of glazing material that is deposited is a function of the amount of already deposited CP-toner (counter-image-wise application). This latter way of applying glazing material equalizes the surface relief of the image to be fired, i.e. much glazing material is present where no CP-toner is present and less glazing material is applied where CP-toner in maximum density is present. The counter-image-wise application of the glazing material can be beneficial to smooth out differences in height in the toner in the master image and to have a smooth image after firing.

In a more preferred implementation of this fourth embodiment of the invention, the glazing material is applied on top of said image wise deposited CP-toner by electro(stato) graphical means either non-image-wise, image-wise or counter-image-wise. Thus an image-wise, non-image wise or counter-image-wise deposited layer of GL-toner is preferably applied on top of said layer of CP-toner. In this case the application of the image and the application of the glazing material proceeds on-line, i.e. in the same electrostatographic printing apparatus and before fusing the image.

It will be clear that every embodiment of this invention can, if so desired, easily be combined with one or more other of the other embodiments to provide master images with the desired amount of glazing material.

It is preferred for realizing the objects of this invention to bring the glazing material in the master image via a CPGL-toner, i.e. the first embodiment of the invention. Although the implementation of the other embodiments of the invention can, when implemented alone, realize the objects of the invention, it is preferred to combine these other embodiments with the first embodiment of the invention, so that the master image contains always at least one toner layer, wherein toner particles comprising both a ceramic pigment and glazing material are present.

All embodiments or combinations of embodiments of the present invention can be used for forming monochrome master images as well as for the production of full color master images. Monochrome image can also be produced by using different toner particles having the same color, but different saturation, this makes it possible to extend the printable gray scale and yields high quality monochrome images. A technique for producing monochrome images by using different toner particles with the same color but different saturation has been described in, e.g., European Application 95202768, filed on Oct. 13, 1995.

A master image according any of the embodiments of the present invention, may, after the final fusing step, be transferred as such (after optional deposition of a lacquer aiding the transfer) to the object to be decorated. It is also possible to provide additional layers and a lacquer, aiding the transfer, on a master image according to any of the embodiments of the present invention, before transfer to the object to be decorated. The additional layers can be, e.g., a gold, silver, or platinum decoration,; a layer providing a relief pattern,; an additional layer of glazing material, etc. Said additional layers can be applied by any means known in the art, e.g., by coating, spraying, screen printing, etc.

The Ceramic Pigments

Any ceramic pigment known in the art is useful in the present invention. Useful pigment are, e.g., pure metals (colloidal gold, iron, etc.), metal oxides, mixtures of both. Metal oxides, very useful as ceramic pigment in the present invention are generally speaking compounds made up of a mixture of oxides of the transition elements or of a mixture of oxides of the transition elements and metal oxides of the main groups of the periodic table. Typically an oxide, useful as ceramic pigment in the present invention, has a spinel structure and are prepared by mixing an oxide or oxides of divalent metals (e.g., MgO, ZnO, CoO, FeO, etc.) with an oxide or oxides of trivalent metals (e.g. $Al_2O_3$ $Cr_2O_3$, $Fe_2O_3$). Also colorless zirconium compounds in the crystal lattice of which coloring ions of transition metals are incorporated, e.g., zirconium vanadium yellow baddeleyite, zirconium iron pink zircon, etc., are useful ceramic pigments within the scope of the present invention. Preferred ceramic pigments, useful in this invention, are selected from the group of crystal classes consisting of baddeleyites, borates, corundum-hematites, garnets, olivines, periclase, phenacite, phosphates, priderite, pyrochlore, rutile-cassiterites, sphene, spinels and zircon. Most preferred pigments are mixed oxides selected from the group of crystal classes consisting of baddeleyites, spinels and zircons. An good overview of ceramic pigments, useful in the present invention can be found in Table 1, page 546 and 547, of Volume A 5 of Ullmann's Encyclopedia of Industrial Chemistry, fifth, completely revised edition, 1986 distributed by VCH Verlagsgesellschaft GmbH, D-6940 Weinheim (Germany) or by VCH publishers, 220 East 23rd street New York, ISBN 3-527-20105X (Weinheim) or ISBN 0-89573-155x (New York). Commercially available very useful pigments are available from BASF, Ludwigshafen, Germany under trade name SICOCER.

Decoration of enamel, ceramic or glass objects often proceeds with a pure metal, especially with gold, platinum or silver. When this is the case the ceramic pigment is very often a colloidal solution of the metal. It is very useful, in the present invention to precipitate the metal from the colloidal solution on to particles of a carrier material (e.g. $TiO_2$, $SiO_2$, glazing material, etc.). A toner comprising such a carrier material with a metal precipitated on it is then, according to the definitions in this document, in fact a CP-toner containing as ceramic pigment the metal precipitated on the carrier. The volumetric particle size distribution of the carrier material whereon the metal is precipitated is preferably such that 90% of the particles have a diameter lower than $\frac{2}{3}$ times $d_v$, more preferably this distribution is such that 90% of the particles have a diameter lower than $\frac{1}{2}$ times $d_v$.

It is also possible to intimately adhere the (basic) ceramic pigment to an amount of glazing material, forming composite particles comprising ceramic pigment and glazing material. This can be done by, e.g., mixing the components, firing them, and milling them again to a fine particle size. A toner comprising such composite particles, is then, according to the definitions in this document, in fact a CP-toner containing as ceramic pigment the composite particle. The volumetric particle size distribution of the composite is preferably such that 90% of the particles have a diameter lower than $\frac{2}{3}$ times $d_v$, more preferably this distribution is such that 90% of the particles have a diameter lower than $\frac{1}{2}$ times $d_v$.

The Glazing Material

The glazing material useful in the present invention are essentially a mixture of a metal oxide with siliciumdioxide and/or borontrioxide. Typical useful glazing materials comprise network formers (e.g. $SiO_2$, $B_2O_3$), an intermediate (e.g. PbO, ZnO, $PbO_2$, $Al_2O_3$) and a modifier (e.g. $Na_2O$, CaO) As modifier $Na_2O$ can be replaced by oxides of the other alkali metals and CaO can be replaced by oxides of other alkaline earth metals. A survey of useful glazing materials (compositions) for this invention can be found in table 10 on page 31 and in paragraph 5.1. on page 31 to 33 of volume 6A of Ullmann's Encyclopedia of Industrial Chemistry, fifth, completely revised edition, 1986, distributed by VCH Verlagsgesellschaft GmbH, D-6940 Weinheim (Germany) or by VCH publishers, 220 East 23rd street New York, ISBN 3-527-20106-8 (Weinheim) or ISBN 0-89573-156-8 (New York). A fired mixture of glazing materials, as described immediately above, i.e. a pre-fired glazing, is also useful as glazing material in the present invention. When a pre-fired glazing material is used it is preferred to mill the pre-fired glazing so as to have pre-fired glazing particles with an average diameter between 1 and 20 μm.

A very useful glazing material is available from Commercially available very useful pigments are available from BASF, Ludwigshafen, Germany under trade name SICO-CER P 17 025.

The Toner Particles

The toner particles to be used in this invention (CP-toner, GL-toner and CPGL-toner) comprise a resin. The resin used in all types of toners can be the same or different. Any toner resin known in the art can be used for manufacturing toners useful in this invention. The toner resin used can be a polycondensation polymer or a mixture of different polycondensation polymers as well as an addition polymer or a mixture of addition polymers. Also mixtures of polycondensation polymers and addition polymers are suitable as toner resin for toner particles useful in the present invention.

Also epoxy resins, as, e.g., EPIKOTE 1004 (EPIKOTE is a registered trade mark of the Shell Chemical Co.), can be used in this invention.

Also polymers comprising blocks of polycondensation polymers and blocks of addition polymers, prepared, e.g., by grafting an addition polymer having reactive groups on a polyester can be used in the preparation of toner particles useful in this invention. Toner resins used in toner particles according to the present invention preferably have an acid value (AV) or an hydroxyl value (HV)>3 mg KOH/g. The presence of hydroxyl and/or carboxyl groups in the toner resins used in the present invention, seems to basically increase the cohesion between toner resin and ceramic pigments and/or glazing material. This cohesion within the toner particles is very important both during the preparation of the toner particles (the good cohesion diminishes loss of pigment during milling) as during the use of the toner particles (the mechanical impact during development as only a limited influence on eventual dust formation in the printer). Therefore it is even preferred to use in toner particles useful in this invention resins with an acid value (AV) and/or an hydroxyl value (HV)>7 mg KOH/g. Typical examples of very useful toner resins are tabulated in table 1.

TABLE 1

| Nr | Chemical structure | AV | HV | Tg |
|---|---|---|---|---|
| P1 | Polyester resin of terephthalic acid, ethyleneglycol and DIANOL 22 | 3 | 31.1 | 62 |
| P2 | Polyester resin of fumaric acid and DIANOL 33 (ATLAC T500, trade name) | 17 | 5.2 | 55 |
| P3 | Polyester resin of terephthalic acid 40 mol %), isophthalic acid (60 mol %) and DIANOL 22 (40 mol %) and ethyleneglycol (60 mol %) | 18 | 20.9 | 60 |
| S1 | Polyester resin of DIANOL 33/DIANOL 22, terephthalic acid and trimellitic acid | 12 | 0 | 58 |
| S2 | Copoly(styrene-butylacrylate-butylmethacrylate-stearylmethacrylate-methacrylic acid) (65/5/21/5/4) | 5 | 0 | 63 |
| P4 | Copoly(styrene-butylmethacrylate-acrylic acid (80/15/5) | 30 | 50 | 65 |
| S3 | Co(Styrene/n-butylmethacrylate), diCOOH terminated (65/35) | 15 | 0 | 48 |

DIANOL 22 is a trade name of AKZO CHEMIE of the Netherlands for bis-ethoxylated 2,2-bis(4-hydroxyphenyl) propane.

DIANOL 33 is a trade name of AKZO CHEMIE of the Netherlands for bis-propoxylated 2,2-bis(4-hydroxyphenyl) propane.

When polycondensation polymers are used, the use of polyesters is preferred. Polyester resins suitable for use in toner particles according to the present invention are selected e.g. from the group of linear polycondensation products of (i) di-functional organic acids, e.g. maleic acid, fumaric acid, terephthalic acid and isophthalic acid and (ii) di-functional alcohols (diol) such as ethylene glycol, triethylene glycol, an aromatic dihydroxy compound, preferably a bisphenol such as 2,2-bis(4-hydroxyphenyl)-propane called "Bisphenol A" or an alkoxylated bisphenol, e.g. propoxylated bisphenol examples of which are given in U.S. Pat. No. 4,331,755. For the preparation of suitable polyester resins reference is made to GB-P 1,373,220. When addition polymers are used, it is preferred to use styrene/acrylic resins. Preferred styrene-acrylic resins have a relatively high (more than 70 mol %) styrene content, and are more particularly copolymers of styrene-acrylic resins or styrene-methacrylic resins, e.g. copoly(styrene/n-butylmethacrylate) or copoly(styrene/2-ethyl-hexylacrylate). The toner resins, for preparing toner particles useful in this invention, can be cross-linked.

Toner particles useful in this invention can have an average volume diameter ($d_v$) between 1 and 50 μm, preferably between 3 and 20 μm, more preferably between 5 and 15 μm. When the toner particles are intended for use in color imaging, it is possible within the scope of this invention, to use toner particles with a volume average diameter ($d_v$) between 5 and 10 μm, even between 5 and 7 μm. The particle size distribution of said toner particles can be of any type. It is however preferred to have an essentially (some negative or positive skewness can be tolerated, although a positive skewness, giving less smaller particles than an unskewed distribution, is preferred) Gaussian or normal particle size distribution, either by number or volume, with a coefficient of variability (standard deviation divided by the average) (n) smaller than 0.5, more preferably of 0.3.

All toner particles, useful in the present invention, i.e. toner particles comprising a ceramic pigment, glazing material or both, comprise preferably on an average more than 30%, preferably more than 50% by volume (with respect to the average volume of the toner particles) of toner resin. The presence of toner resin in the toner particles gives, after fusing of the master image to the temporary support, a coherence of the toner layers making up the master image. This means that, for the transfer of the master image to the object to be decorated the type of lacquer and amount of lacquer used on top of the master image can be chosen more freely. When the toner image does not present any coherence, the lacquer used during transfer must primarily be chosen for providing a good coherence of the toner layers making up the toner image. With toner layers having some coherence from themselves, the lacquer can be chosen for other criteria than that of providing coherence: e.g. a lacquer can be chosen because it can be applied from a solution using ecological solvents, or because the lacquer burns easily during firing, etc.

It was found that is was beneficial that toner particles useful in this invention had a meltviscosity η, between 100 and 10,000 Pa.s. The meltviscosity is measured in a RHEOMETRICS dynamic rheometer, RVEM-200 (One Possumtown Road, Piscataway, N.J. 08854 USA) is used. The viscosity measurement is carried out at a sample temperature of 120° C. The sample having a weight of 0.75 g is applied in the measuring gap (about 1.5 mm) between two parallel plates of 20 mm diameter one of which is oscillating about its vertical axis at 100 rad/sec and amplitude of 10-3 radians. Before recording the measurement signals which are expressed in poise (P) or Pascal.second (Pas) the sample is allowed to attain thermal equilibrium for 10 minutes.

The present invention encompasses thus toner particles comprising a toner resin, a ceramic pigment (CP) and glazing material (GL) dispersed in said resin so as to have said pigment and said glazing material in the bulk of said particles, characterized in that a) said toner particles have a volume average particle size $d_v$, such that $5<d_v<15$ μm, b) said ceramic pigment has a volumetric particle size distribution such that 90% of the particles have a diameter lower than ⅔ times $d_v$ and c) said glazing material has a volumetric particle size distribution such that 90% of the particles have a diameter lower than ⅔ times $d_v$.

In these toner particles said ceramic pigment (CP) and said glazing material (GL) are preferably present in a volume ratio fulfilling the equation $0.5<GL/CP<5$, more preferably in a volume ratio fulfilling the equation $1<GL/CP<3$.

The present invention also encompasses toner particles comprising a ceramic pigment (CP) and a toner resin characterized in that a) said toner particles have a volume average particle size $d_v$, such that $5<d_v<15$ μm, and b) said ceramic pigment has a volumetric particle size distribution such that 90% of the particles have a diameter lower than ⅔ times $d_v$.

The present invention further encompasses toner particles comprising a toner resin and glazing material (GL) characterized in that a) said toner particles have a volume average particle size $d_v$, such that $5<d_v<15$ μm, and b) said glazing material has a volumetric particle size distribution such that 90% of the particles have a diameter lower than ⅔ times $d_v$.

The toner particles for use in this invention comprise further preferably a toner resin in an amount of at least 30%, more preferably 50% by volume with respect to the average volume of the toner particles and have preferably a meltviscosity between 100 and 10,000 Pa.s. The toner resin, used in toner particles according to this invention is preferably a polymer with acid value (AV) or hydroxyl value (HV)>3 mg KOH/g, preferably>7 mg KOH/g.

The toner particles can, apart from ceramic pigment, glazing material and a resin, further comprise any normal toner ingredient e.g. charge control agents, pigments both colored and black, dyes, release agents, resistivity regulating agents, inorganic fillers, etc. A description of charge control agents, pigments and other additives useful in toner particles, to be used in a toner composition according to the present invention, can be found in e.g. EP-A 601 235.

The toner particles can be magnetic or non-magnetic. The developer used to form the master image on a temporary support in a method according to this invention can be any developer known in the art of electrostatography or magnetography, it can, e.g. be a mono-component magnetic developer, a non-magnetic mono-component developer, a multi-component developer comprising non-magnetic toner particles and magnetic carrier particles, etc. The magnetic carrier particles can be iron, magnetite, ferrite, etc. Carrier particles coated with a resin as well as un-coated carrier particles can be used in this invention. The carrier particles can also be composite carriers comprising magnetic material in a matrix of organic resin. Such carrier have be disclosed in, e.g., U.S. Pat. Nos. 5,336,580 and 4,879,198. Carrier particles useful in his invention have preferably an average particle diameter by volume between 20 and 150 μm, more preferably between 40 and 80 μm.

The Temporary Support

The temporary support can be any support known in the art, provided that said support has releasing properties. I.e., a temporary support is used making it possible to easily transfer a master image, made of toner particles fixed on the temporary support, to the object to be decorated, without damaging the master image.

Typical useful supports are, e.g., paper with a gum arabic coating, siliconized paper, paper with a wax coating, etc.

The temporary support for use in this invention can also be any polymeric support known and commonly employed in the art. They include, e.g. those supports used in the manufacture of photographic films including cellulose acetate propionate or cellulose acetate butyrate, polyesters such as poly(ethyleneterephthalate), polyamides, polycarbonates, polyimides, polyolefins, poly(vinyl acetals), polyethers and polysulfonamides. It can further be a composite support as, e.g., polyethylene coated paper. When using such a support with a polymeric surface, it is beneficial to use a support whereon a release layer is present.

Said release layer may be a layer of gum arabic, a wax coating, etc.

It can also be a release layer as disclosed in e.g. U.S. Pat. No. 4,482,625 and EP-A 529 697. When a temporary support with a release layer is used in this invention, said release layer comprises preferably compounds having a certain degree of hydrophilicity. A release layer for use in the present invention comprises preferably either an hydroalkylcellulose compound in which alkyl stay for a C1 to C6 alkylgroup and/or a polyvinylalcohol/polyvinylacetate mixture. The thickness of said release layer is in the range of 0.1 to 4 $\mu$m, preferably in the range between 0.5 and 2 $\mu$m.

The Transfer of the Master Image to the Object to be Decorated

The transfer of a master image, according to this invention, to the object to be decorated can proceed in two ways, with as results i) the layer closest to the temporary support of the master image is also the layer closest to the surface of the object to be decorated and ii) the layer closest to the temporary support of the master image is the layer farthest away of the surface of the object to be decorated.

The first method is the most commonly used method in the art of transferring master images produced by, e.g., screen printing and is also a recommendable method for transferring master images, according to this invention. The reason for the choice of the first method is that the master image does not have to be printed as the mirror image of the final image on the object to be decorated. In the first method, the master image on the temporary support is treated with a film forming (non-water soluble) lacquer, treated with water, and the moistened pack, comprising the lacquer layer firmly adhered to the master image is slid on the object, where the image can further be exactly positioned while still wet. In this first method it is preferred to use a temporary support comprising a gum arabic release, since such a release layer easily dissolves in water. The first method can also be executed by applying a moistened tampon that is pressed against the master image present on a temporary support with, e.g., a gum arabic release layer. By the water, contained in the tampon, the image is released from the temporary support and adheres to the tampon wherefrom it is transferred to the object to be decorated.

In the second method an adhesive lacquer can be used to be applied on top of the master image. The object to be decorated is then pressed against said adhesive lacquer and after adhesion the temporary support is stripped away. Useful adhesive lacquers are solutions comprising in an organic solvent one or more thermoadhesive polymers chosen from e.g. co(styrene-butylacrylate-methacrylic acid), co(styrene-butylmethacrylate-methacrylic acid), co(vinylidenechloride-methacrylate-itaconicacid), co(methylmethacrylate-butadiene-itaconic acid), polyvinylacetate, co(vinylacetate-ethylene), co(n.butylmethacrylate-i.butyl-methacrylate), poly-n.butylmethacrylate, poly-i.butylmethacrylate, co(methylmethacrylate-ethylacrylate), co(vinylacetate-vinyllaurate), co(vinylacetate-vinyllaurate-itaconic acid).

The temporary support used for the production of a master image according to this invention that is intended to be transferred to the object to be decorated by the second method described immediately above is preferably very flexible, since otherwise the accommodation of the master image to a non-flat support is hindered. Therefore when using paper or plastic as temporary support the support is preferably quite thin, e.g. when using a polyester support, this support is preferably between 10 and 200 $\mu$m preferably between 20 and 100 $\mu$m, more preferably between 20 and 50 $\mu$m, thick.

As stated above, in both methods for transferring master images, according to this invention, to the object to be decorated a layer of a lacquer is preferably applied on top of the master image, this lacquer protecting the master image and providing coherence to the toner layers of the master image so that the master image is not disturbed during transfer. This lacquer is, as said above, preferably film forming and non-water-soluble, and it further preferably forms a plastic deformable film so that the master image, released from the temporary support, can easily be adapted to non-flat images. For transferring the master image to the object to be decorated, any lacquer known in the art of decorating ceramics or glass by master images to be useful to transfer the master image can be used in this invention. Examples are e.g. a collodion solution as disclosed in DE-A 40 41 358.

The lacquer can be applied by spraying, by coating etc. The lacquer can also be applied image-wise, e.g., by screen-printing. If so desired, it is possible to add some glazing material in to the solution comprising the lacquer, thus providing glazing material in the master image by the application of the transfer lacquer. The lacquer can also be a colorless toner comprising a toner resin that after fusing forms a film. When using such a lacquer, the lacquer can be applied by electrostatographic means.

In the second embodiment of the invention, as described above, the master image can comprise, in the order given: a support, a release layer, a layer of glazing material and one or more toner layers forming the image and optionally, when the lacquer is in the form of a colorless toner, a lacquer.

In the third embodiment of the invention, as described above, the master image can comprise, in the order given: a support, a release layer, one or more CP-toner layers forming the image and a layer of glazing material and optionally, when the lacquer is in the form of a colorless toner, a lacquer.

Since it is preferred that during, the firing, the master image, transferred to the object to be decorated, presents the CP-toner layers on the surface of the object and a layer of glazing material covering said master image, the choice between the first and the second embodiment of this invention depends on the way that the master image is transferred. When the transfer proceeds according the first method of transferring (see immediately above) it is preferred to use a master image made by the second embodiment of this invention, since then on the object to be decorated, the layer of glazing material will cover the CP-toner image. When the transfer proceeds according the second method of transferring (see immediately above) it is preferred to use a master image made by the first embodiment of this invention, since then, on the object to be decorated, the layer of glazing material will cover the CP-toner image.

An apparatus for forming a master image according to this invention.

The present invention can be practiced in any electrographic or magnetographic imaging method. It can be useful in classical electrophotography, in ionography, in direct electrostatic printing (DEP), etc. or in apparatus combining some of said imaging methods. The present invention is useful for mono-chromatic toner images as well as for multi-chromatic and full color toner images. The master image, according to this invention, can be printed starting from an original that is optically scanned or from a digital original. The original images can be contone, i.e. gray levels are reproduced by gray density modulation as well as half-tone, i.e. gray levels are reproduced by area modulation. Also line original, e.g. text, and any combination of contone, half-tone and line originals can be used in the method of this invention.

If so wished, it is possible within the scope of this invention, to provide additional toner layers on the master image. E.g., for gloss equalization, for surface relief equalization, etc.

Thus in an apparatus, for producing a master image according to this invention, several means for image-wise or non-image-wise applying of toner particles can be present and said means for depositing toner particles can be direct electrostatic printing means, wherein charged toner particles are attracted to the substrate by an electrical field and the toner flow modulated by a printhead structure comprising printing apertures and control electrodes.

Said means for depositing toner particles can also be toner depositing means wherein first a latent image is formed. In such an apparatus, said means for depositing toner particles comprise:

means for producing a latent image on a latent image bearing member, means for developing said latent image by the deposition of said toner particles, forming a developed image and means for transferring said developed image on said substrate.

Said latent image may be a magnetic latent image that is developed by magnetic toner particles (in magnetography) or, preferably, an electrostatic latent image. Such an electrostatic latent image is preferably an electrophotographic latent image and the means for producing a latent image are in this invention preferably light emitting means, e.g., light emitting diodes or lasers and said latent image bearing member comprises preferably a photoconductor.

An apparatus for forming a master image according to this invention, whatever the toner depositing means, comprises preferably at least two toner depositing stations. More preferably an apparatus for forming full color images is used, comprising at least three toner depositing stations. Typical examples of apparatus useful for forming a master image according to the present invention, are a commercial CHROMAPRESS (a trade name of Agfa-Gevaert NV, Mortsel, Belgium), used in simplex mode and wherein five toner depositing station are present on one side of the image receiving member (i.e. in this invention the temporary support whereon the master image is formed), or an AGFA XC305 color copier. Also apparatus as disclosed in EP-A 742 496 or equivalent co-pending U.S. Ser. No. 08/641,070 filed on Apr. 29, 1996 and in EP-A 742 497 or equivalent co-pending U.S. Ser. No. 08/636,829 filed on Apr. 23, 1996, used in simplex mode are very useful for producing a master image according to this invention. When more toner layers are wished in the master image than the number of toner depositing stations present in the apparatus it is possible to print the master image in multi-pass.

An apparatus for implementing the method according to the present invention, can comprise any fusing means known in the art. The fusing means can combine heat and pressure, radiant heat e.g. hot air, or infra-red radiation, etc. When using fusing means combining heat and pressure, heated pressure rollers can be used and silicone oil is used to impart release properties to the rollers. When using such fusing means in an apparatus for implementing a method according to this invention, it is preferred to apply said silicone oil to said rollers in such an amount that on top of the master image at most 1 g/m$^2$ of silicone oil is present. Having more silicone oil can give problems when transferring and adhering the master image to the object to be decorated. It is preferred, in an apparatus implementing a method according to this invention, to use fusing means using radiant heat, while in that case no silicone oil at all is present on the master image.

EXAMPLES

1. The Toners 1.1. The CP-toners

For the preparation of CP-toners, 87 parts by volume of polyester P3 of table 1 were melt-blended for 30 minutes at 110° C. in a laboratory kneader with 13 parts by volume of a ceramic pigment (SICOCER F BLAU number 10518 trade name for a blue pigment for decoration of enamel comprising Cr/Co/Al and available from BASF AG, Ludwigshafen, Germany).

After cooling the solidified mass was pulverized and milled using an ALPINE Fliessbettgegenstrahlmuhle type 100AFG (trade name) and further classified using an ALPINE multiplex zigzag classifier type 100MZR (trade name). The average particle diameter ($d_v$) of the separated toner was measured by Coulter Counter LS130 (trade name) was found to be 12 μm by volume.

Two CP-toners were prepared, one (CP1) with a pigment having a volumetric size distribution such that 20% of the particles were larger than ⅔ $d_v$ and that 40% of the particles were larger than ½ $d_v$ and an other (CP2) such that 2% of the particles were larger than ⅔ $d_v$ and that 8% of the particles were larger than ½ $d_v$.

The meltviscosity at 120° C. was for both toners about 600 Pa.s.

1.2 GL-toner

The same procedure was followed for the production of GL-toners, except for the presence of 13 parts by volume of SICOCER P Transparant number 17025 (trade name for a transparent glazing material, available from BASF AG, Ludwigshafen, Germany).

Five GL toners (GL1 to GL5), having an average volume diameter $d_v$ of 11 μm, were prepared with glazing material having different particle size distributions. The relevant parameters (within the scope of this invention) of the volumetric particle size distribution of the glazing material (GL) that was used are given in table 2.

The meltviscosity at 120° C. was for the five GL-toners about 750 Pa.s.

TABLE 2

|  | % > $d_v$ | % > ¾ $d_v$ |
|---|---|---|
| GL1 | 29 | 58 |
| GL2 | 10 | 28 |
| GL3 | 6 | 22 |
| GL4 | 0.6 | 10 |
| GL5 | 0 | 0.2 |

1.3. CPGL-toners

Two CPGL-toners were prepared in the same way as described above except for the fact that 74 parts by volume of polyester P3 of table 1 were used and that 13 parts by volume of a ceramic pigment (SICOCER F BLAU number 10518 trade name for a blue pigment for decoration of enamel comprising Cr/Co/Al and available from BASF AG, Ludwigshafen, Germany) were added together with 13 parts by volume of SICOCER P Transparant number 17025 (trade name for a transparent glazing material, available from BASF AG, Ludwigshafen, Germany).

The two CPGL-toners had an average volume diameter ($d_v$) of 12 μm.

Toner CPGL1 comprised as ceramic pigment (CP) a pigment having a volumetric size distribution such that 20% of the particles were larger than ⅔ $d_v$ and that 40% of the particles were larger than ½ $d_v$ and as glazing material (GL) glazing material with a volumetric distribution as described with GL1 in table 2.

Toner CPGL2 comprised as ceramic pigment (CP) a pigment having a volumetric size distribution such that 2% of the particles were larger than ⅔ $d_v$ and that 8% of the particles were larger than ½ $d_v$ and as glazing material (GL) glazing material with a volumetric distribution as described with GL5 in table 2.

The meltviscosity at 120° C. was for both toners about 1400 Pa.s.

To produce the ceramic pigments and glazing material with different volumetric particle size distribution both the commercial pigments given above were used as such and after being milled using an ALPINE Fliessbettgegenstrahlmühle type 100AFG (trade name) and further classified using an ALPINE multiplex zig-zag classifier type 100MZR (trade name). The particle size distribution was measured using a Coulter Counter LS130 (trade name) equipped with a measuring tube of 30 μm diameter, whereas the particle size distributions of the toner were measured using a 70 μm tube.

2. Printing of the Master Image and Transferring It

With each of the above prepared toners carrier-toner developers were prepared by mixing said toner particles and 0.5% of hydrophobic colloidal silica particles (BET-value 130 m²/g) in a 4% ratio with silicone-coated Cu-Zn ferrite carrier particles having an average diameter of 55 μm. These developers were used in a CHROMAPRESS (a trade name of Agfa-Gevaert NV, Mortsel, Belgium), used in simplex mode and using only two toner stations.

The toners were deposited on paper comprising gum arabic as release layer. Even density patches were printed. First an even patch of CP-toner, was deposited on the substrate in an amount of 1.1 mg/cm². On top of this even patch of toner an even patch of GL-toner was deposited in an amount of 1.5 mg/cm². When using the CPGL-toners an even patch of the toner was applied in an amount of 1.5 mg/cm².

After fixing, the master images were coated (spray coating) with a release lacquer (FILM-SPRAY for slide-off transfer, trade name, available from Lackfabrik J. Albrecht, Mainz, Germany) and transferred to a ceramic tile. The image was fired for 30 minutes at 850° C. After firing the noise (graininess) of the even density patches was judged visually and give a score from 5 (very bad) to 1 (very good), a quotation of 3 being acceptable. The results are given in table 3.

TABLE 3

| CP-toner | GL-toner | Noise |
|---|---|---|
| CP1 | GL1 | 5 |
| CP1 | GL2 | 4 |
| CP1 | GL3 | 3 |
| CP1 | GL4 | 3 |
| CP1 | GL5 | 2 |
| CP2 | GL1 | 4 |
| CP2 | GL2 | 3 |
| CP2 | GL3 | 2 |
| CP2 | GL4 | 2 |
| CP2 | GL5 | 1 |
| CPGL1 | none | 5 |
| CPGL2 | none | 1 |

What is claimed is:

1. An electrostatographic method for producing a master image for decorating ceramic, enamel or glass objects comprising the steps of:

providing a temporary support having a surface with release properties, image-wise depositing charged toner particles, with a volume average particle size $d_v$, such that 5 μm<$d_v$<15 μm and including a resin and, dispersed in said resin, particles of a ceramic pigment, CP, said particles of ceramic pigment having a volumetric particle size distribution such that 90% of said particles of ceramic pigment have a diameter lower than ⅔ times $d_v$ and providing particles of glazing material, having a volumetric particle size distribution such that 90% of said particles of glazing material have a diameter lower than ⅔ times $d_v$, in said master image.

2. A method according to claim 1, wherein said particles of said ceramic pigment have a volumetric particle size distribution such that 90% of said particles have a diameter lower than ½ times $d_v$.

3. A method according to claim 1, wherein said particles of said glazing material has a volumetric particle size distribution such that 90% of said particles have a diameter lower than ¾ times $d_v$.

4. A method according to claim 1, wherein said particles of said glazing material has a volumetric particle size distribution such that 90% of said particles have a diameter lower than ½ times $d_v$.

5. A method according to claim 1, wherein said ceramic pigment is a member selected from the group of metals, metal oxides and mixtures of both.

6. A method according to claim 5, wherein said particles of said glazing material are provided on said master image, by applying said particles of said glazing material on said temporary support before image-wise depositing said toner particles including particles of a ceramic pigment.

7. A method according to claim 6, wherein said particles of glazing material are applied to said support by depositing toner particles, including a toner resin and dispersed therein said particles of glazing material, before image-wise depositing said toner particles including particles of a ceramic pigment.

8. A method according to claim 5, wherein at least two layers of toner particles including particles of a ceramic pigment are image-wise deposited and said glazing material is applied between said at least two layers.

9. A method according to claim 8, wherein said glazing material is applied by electro(stato)graphically depositing a layer of toner particles, including said particles of said glazing material between said at least two layers of toner particles including particles of a ceramic pigment.

10. A method according to claim 9, wherein said layer of toner particles, including said particles of said glazing material is image-wise deposited.

11. A method according to claims 5, wherein said glazing material is applied as an outermost layer.

12. A method according to claims 11, wherein said glazing material is applied as an outermost layer by depositing toner particles, including said particles of said glazing material.

13. A method according to claim 12, wherein said toner particles, including said particles of said glazing material are image-wise deposited on top of image-wise deposited toner particles including particles of a ceramic pigment.

14. A method according to claim 5, wherein said glazing material is applied in said master image by image-wise depositing toner particles including both said particles of a ceramic pigment and said particles of glazing material.

15. A method according to claim 1, wherein said ceramic pigment is a member selected from the group of crystal classes consisting of baddeleyites, borates, corundum-hematites, garnets, olivines, periclase, phenacite, phosphates, priderite, pyrochlore, rutile-cassiterites, sphene, spinels and zircons.

16. A method according to claim 1, wherein said ceramic pigment is selected from the group of mixed oxides consisting of baddeleyites, spinels and zircons.

17. A method according to claim 16, wherein said particles of said glazing material are provided on said master image, by applying said particles of said glazing material on said temporary support before image-wise depositing said toner particles including particles of a ceramic pigment.

18. A method according to claim 17, wherein said particles of glazing material are applied to said support by depositing toner particles, including a toner resin and dispersed therein said particles of glazing material, before image-wise depositing said toner particles including particles of a ceramic pigment.

19. A method according to claim 16, wherein at least two layers of toner particles including particles of a ceramic pigment are image-wise deposited and said glazing material is applied between said at least two layers.

20. A method according to claim 19, wherein said glazing material is applied by electro(stato)graphically depositing a layer of toner particles, including said particles of said glazing material between said at least two layers of toner particles including particles of a ceramic pigment.

21. A method according to claim 20, said layer of toner particles, including said particles of said glazing material is image-wise deposited.

22. A method according to claim 16, wherein said glazing material is applied as an outermost layer.

23. A method according to claim 22, wherein said glazing material is applied as an outermost layer by depositing toner particles, including said particles of said glazing material.

24. A method according to claim 23, wherein said toner particles, including said particles of said glazing material are image-wise deposited on top of image-wise deposited toner particles including particles of a ceramic pigment.

25. A method according to claim 16, wherein said glazing material is applied in said master image by image-wise depositing toner particles including both said particles of a ceramic pigment and said particles of glazing material.

26. Toner particles, having a volume average particle size $d_v$, such that $5 \mu < d_v < 15 \mu m$, comprising a toner resin, and dispersed therein both particles of a ceramic pigment, CP, having a volumetric particle size distribution such that 90% of said particles of ceramic pigment have a diameter lower than $\frac{2}{3}$ times $d_v$, and particles of glazing material, GL, having a volumetric particle size distribution such that 90% of said particles of glazing material have a diameter lower than $\frac{2}{3}$ times $d_v$.

27. Toner particles according to claim 26, wherein said particles of said ceramic pigment, CP, and said particles of said glazing material, GL, are present in a volume ratio fulfilling the equation $0.5 < GL/CP < 5$.

28. Toner particles according to claim 26, wherein said toner resin is present in an amount of at least 30% by volume with respect to said average volume of said toner particles.

29. Toner particles according to claim 26, wherein said toner particles have a meltviscosity between 100 and 10,000 Pa.s.

30. Toner particles according to claim 26, wherein said toner resin is a polymer with acid value (AV)>3 mg KOH/g.

31. Toner particles according to claim 26, wherein said toner resin is a polymer with hydroxyl value (HV)>3 mg KOH/g.

32. Toner particles according to claim 26, wherein said ceramic pigment is a member selected from the group of metals, metal oxides and mixtures of both.

33. Toner particles according to claim 26, wherein said ceramic pigment is selected from the group of mixed oxides belonging to crystal classes consisting of baddeleyites, spinels and zircons.

\* \* \* \* \*